(12) United States Patent
Borras et al.

(10) Patent No.: US 11,127,288 B2
(45) Date of Patent: Sep. 21, 2021

(54) WRONG WAY DRIVING DETECTION

(71) Applicant: GEOTOLL, INC., Cooper City, FL (US)

(72) Inventors: Jaime Andres Borras, Miramar, FL (US); Wyatt Drake Geist, Davie, FL (US)

(73) Assignee: GEOTOLL, INC., Plantation, FL (US)

( * ) Notice: Subject to any disclaimer, the term of this patent is extended or adjusted under 35 U.S.C. 154(b) by 0 days.

(21) Appl. No.: 17/113,925

(22) Filed: Dec. 7, 2020

(65) Prior Publication Data
US 2021/0174671 A1 Jun. 10, 2021

Related U.S. Application Data

(60) Provisional application No. 62/943,877, filed on Dec. 5, 2019.

(51) Int. Cl.
G08G 1/056 (2006.01)
G08G 1/0962 (2006.01)
H04W 4/021 (2018.01)
G08G 1/07 (2006.01)
G08G 1/127 (2006.01)
G08G 1/16 (2006.01)

(52) U.S. Cl.
CPC ............... *G08G 1/056* (2013.01); *G08G 1/07* (2013.01); *G08G 1/0962* (2013.01); *G08G 1/127* (2013.01); *G08G 1/166* (2013.01); *H04W 4/021* (2013.01)

(58) Field of Classification Search
CPC ........ G08G 1/056; G08G 1/07; G08G 1/0962; G08G 1/166; G08G 1/164; H04W 4/021
See application file for complete search history.

(56) References Cited

U.S. PATENT DOCUMENTS

| 2011/0121992 | A1* | 5/2011 | Konaka | G08G 1/166 340/905 |
| 2013/0044009 | A1* | 2/2013 | Tagawa | G08G 1/0962 340/995.28 |
| 2014/0354454 | A1* | 12/2014 | Nordbruch | G08G 1/056 340/935 |
| 2017/0015243 | A1* | 1/2017 | Geisler | G08G 1/056 |
| 2018/0075743 | A1* | 3/2018 | Al-Deek | G08G 1/164 |
| 2018/0218608 | A1* | 8/2018 | Offenhaeuser | G08G 1/162 |
| 2018/0365989 | A1* | 12/2018 | Song | B60W 50/16 |

(Continued)

Primary Examiner — Andrew W Bee
(74) Attorney, Agent, or Firm — The Concept Law Group, PA; Scott M. Garrett; Scott D. Smiley

(57) ABSTRACT

A mobile device includes an application program that is capable of determining location and a bearing direction of travel. Further, the application program is associated with a back end server that can receive definitions of local geofenced regions, including regions over roadways that indicate the proper bearing direction of traffic for vehicles in those defined regions. The application program monitors its location, which is also the location of a vehicle in which the device is traveling, and compares it with geofenced regions. When the vehicle is within a geofenced region having a traffic direction indication, the application program compares the present bearing direction with that indicated for the geofenced region. When the comparison indicates the vehicle in the wrong direction, the mobile device emits one or more alerts to indicate that the vehicle is traveling in the wrong direction for that traffic lane.

18 Claims, 10 Drawing Sheets

(56) References Cited

U.S. PATENT DOCUMENTS

| | | | |
|---|---|---|---|
| 2019/0031207 A1* | 1/2019 | Nakamura | B60W 50/14 |
| 2019/0139408 A1* | 5/2019 | Lellmann | G08G 1/096716 |
| 2019/0266893 A1* | 8/2019 | Sambo | G08G 1/015 |
| 2020/0258391 A1* | 8/2020 | Raichelgauz | G05D 1/0088 |

* cited by examiner

WRONG WAY DRIVING DETECTION

CROSS-REFERENCE TO RELATED APPLICATION

This application claims priority to U.S. Provisional Patent Application No. 62/943,877 filed Dec. 5, 2019, the entirety of which is incorporated by reference.

FIELD OF THE INVENTION

The present invention relates generally to vehicle navigation applications, and, more particularly, relates to a method by a phone or similar portable device for detecting when a vehicle in which the device is located has entered a roadway in the wrong direction and is traveling against the flow of traffic on the roadway.

BACKGROUND OF THE INVENTION

There is concurrency among DOTs and different Toll Road Authorities that "wrong-way crashes are among the most dangerous and most deadly traffic hazards." These kind of collisions occur on many different roadways, but are especially dangerous on limited access roadways such as interstate roads and similar highways. Frequently these collisions are the result of people not being familiar with locale, and mistaking a roadway exit ramp for an entrance ramp. As a result, they end up traveling in the wrong direction for the side of the roadway they are on.

Several jurisdictions have implemented warning systems to alert drivers traveling in the correct direction that there is an oncoming wrong-way driver. These systems can detect wrong-way drivers using radar, closed-circuit cameras, and other technologies. The system implementation cost varies, but references indicate a typical cost to be around $350,000 per location as of early 2019. Additionally there will be maintenance costs to physically check the warning system each month by driving a car past the sensors to verify that the detection and communication systems are functioning. These tests are typically performed several times per month, and often once per week. The testing alone, which involves driving a vehicle on the wrong side of the roadway, requires shutting down at least a portion of the roadway to perform the test. Given the cost of these systems to set up and maintain, they are not widespread.

Therefore, a need exists to overcome the problems with the prior art as discussed above.

SUMMARY OF THE INVENTION

In accordance with some embodiments of the inventive disclosure, there is provided a method for alerting a driver of wrong way driving that includes defining a geofenced region over a portion of a roadway, including location boundaries of the geofenced region and a proper bearing direction for traffic traveling through the geofenced region. The method can further include a mobile device in a vehicle determining a present location of the mobile device. The method can also include determining that the present location of the mobile device is within the geofenced region and determining a present bearing direction by the mobile device for the present location of the mobile device. The method can also include comparing the bearing direction with the proper bearing direction for traffic traveling through the geofenced region, and determining that the present bearing direction is substantially an opposite direction from that of the proper bearing direction for traffic traveling through the geofenced region. The method can further include the mobile device alerting the user of the mobile device by at least one of an audible alert or a visual alert.

In accordance with a further feature, defining the geofenced region over a portion of the roadway comprises defining the geofenced region over a traffic lane of the geofenced roadway along a portion of the roadway prior to an exit ramp of the roadway.

In accordance with a further feature, defining the geofenced region over a portion of the roadway comprises defining the geofenced region over an initial portion of an exit ramp of the roadway where the exit ramp meets a cross road to the roadway.

In accordance with a further feature, determining a present bearing direction comprises receiving a bearing from a satellite location receiver of the mobile device.

In accordance with a further feature, the method further includes the mobile device transmitting its present location to a backend server. Comparing the bearing direction with the proper bearing direction for traffic traveling through the geofenced region and determining that the present bearing direction is substantially the opposite direction from that of the proper bearing direction for traffic traveling through the geofenced region is performed by the backend server. The method further include the backend server transmitting an alert message to the mobile device.

In accordance with a further feature, alerting the user of the device comprises playing an audible alert by the device.

In accordance with a further feature, playing the audible alert comprises playing a voice recording indicating that the vehicle is traveling in the wrong direction.

In accordance with a further feature, the method further includes the mobile device transmitting a message to a back end service of a service associated with an application program on the device that performs the determining, comparing, and altering steps. The message indicates a present location of the vehicle. The back end server determining a traffic authority associated with the present location of the vehicle. The back end server transmitting a wrong way vehicle alert message to the traffic authority.

In accordance with a further feature, the application program is a toll application program.

In accordance with a further feature, the method further includes the traffic authority performing at least one of activing a road sign on the roadway indicating an oncoming wrong-way driver or causing an alert message to be broadcast in a region of the roadway over a cellular communication system.

In accordance with some embodiments of the inventive disclosure, there is provided a method for determining that a vehicle in which a mobile device is located is traveling in a wrong-way direction on a roadway. The method can include defining a geofenced region over a portion of the roadway, where the geofenced definition includes the location boundaries of the geofenced region and a proper bearing direction for traffic traveling through the geofenced region. The method can further include the mobile device determining a present location and bearing direction of the mobile device. The method can also include determining that the present location of the mobile device is within the geofenced region and comparing the bearing direction of the mobile device with the proper bearing direction for traffic traveling through the geofenced region. The method can also include determining that the present bearing direction is substantially an opposite direction from that of the proper bearing direction for traffic traveling through the geofenced region.

The method can also include the mobile device alerting the user of the mobile device by at least one of an audible alert or a visual alert.

In accordance with a further feature, the method can further include, after alerting the user of the device, and after a pre-selected period of time, determining a subsequent location and bearing direction and determining that the subsequent location and bearing direction indicate that the mobile device is traveling in a wrong direction on the roadway. The method can further include the mobile device transmitting an alert message to a backend server indicating that the mobile device is traveling in wrong way direction.

In accordance with a further feature, determining that the subsequent location and bearing direction indicate that the mobile device is traveling in a wrong direction on the roadway comprises comparing the subsequent location and bearing direction with another geofence region definition that is defined over the roadway.

In accordance with a further feature, the method can further include the backend server determining a region of the geofenced region definition and transmitting an alert message to a traffic authority associated with the region.

In accordance with a further feature, the method can further include the mobile device transmitting the present location and bearing direction to a backend server. Determining that the present location of the mobile device is within the geofenced region, comparing the bearing direction of the mobile device with the proper bearing direction for traffic traveling through the geofenced region, and determining that the present bearing direction is substantially an opposite direction from that of the proper bearing direction for traffic traveling through the geofenced region are performed by the backend server.

In accordance with a further feature, determining that the present bearing direction is substantially an opposite direction from that of the proper bearing direction for traffic traveling through the geofenced region comprising determining the present bearing direction to be within 150 to 210 degrees of the proper bearing direction.

In accordance with some embodiments of the inventive disclosure, there is provided a system for alerting a driver that the driver is traveling in a wrong direction for a roadway. The system can include a mobile device having a satellite positioning receiver that produces location data indicating a present location of the mobile device, and a backend server coupled to a database in which a plurality of geofence region definitions are stored, each of the plurality of geofence region definitions defining a region of a roadway and indicating a proper bearing direction for that region of the roadway. The mobile device is configured to periodically determine its present location and it present bearing direction using the satellite positioning receiver. The mobile device is further configured to alert when the present location of the mobile is within a region corresponding to one of the plurality of geofenced region definitions and that the present bearing direction is substantially opposite that of the proper bearing direction for the one of the plurality of geofenced region definitions.

In accordance with a further feature, the mobile device is configured to transmit its present location and bearing direction to the backend server, and wherein the backend server is configured to compare the present location and bearing direction to at least one of the plurality of geofence region definitions to determine that that the present bearing direction is substantially opposite that of the proper bearing direction.

In accordance with a further feature, the backend server is configured to transmit an alert message to a traffic authority server to report a location of the mobile device.

Although the invention is illustrated and described herein as embodied in a mobile device and method for wrong way driving detection, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
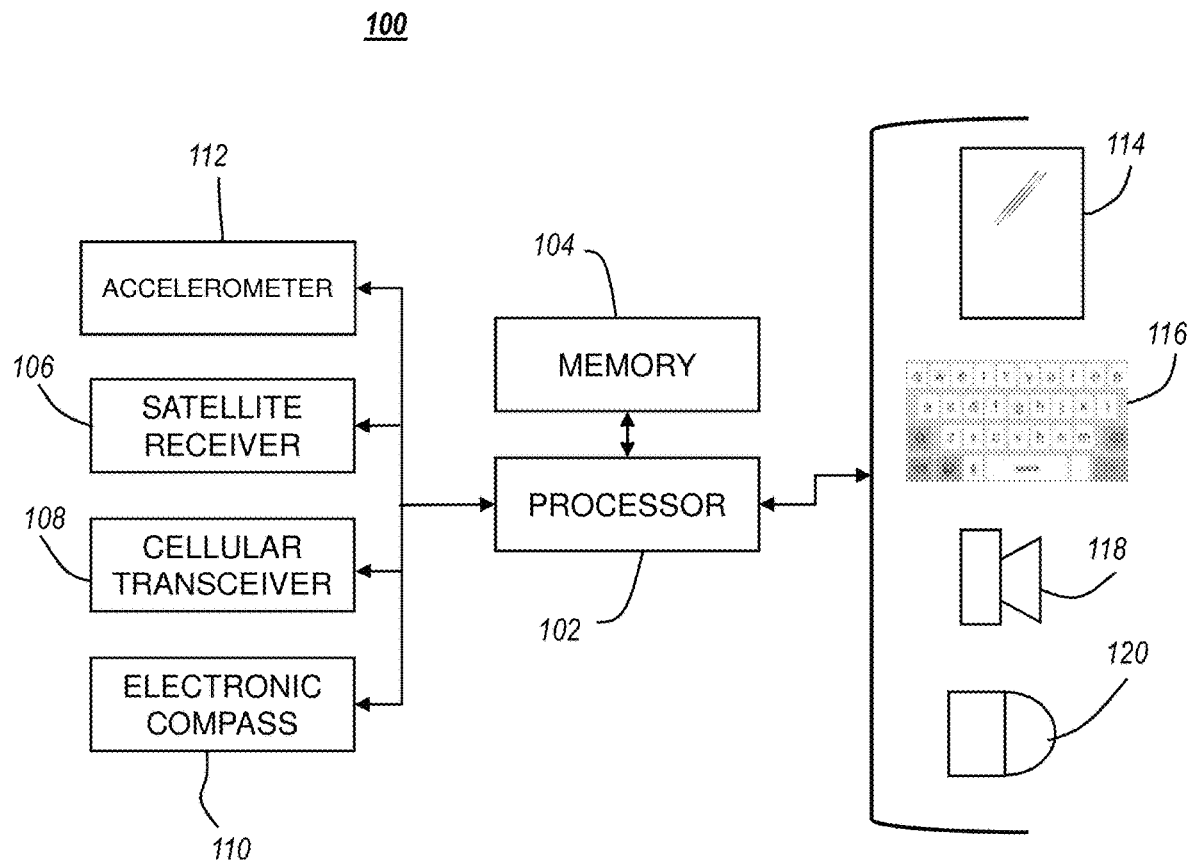
FIG. 1 is a block schematic diagram of a mobile device capable of determining its own location and heading, and which operates instruction code to determine whether it is heading in a correct direction on a roadway, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

FIG. 1 is a block schematic diagram of a mobile device 100 capable of determining its own location and heading, and which operates instruction code to determine whether it is heading in a correct direction on a roadway, in accordance with some embodiments. The mobile device is a portable computing device such as cellular phone or tablet computing device. Among the components and sub-systems included in the device there is a processor 102 which is capable of executing instruction code and performing logical operations on data, as is well known. The processor 102 is coupled to a memory 104 which can represent an aggregate memory of storage and scratch pad random access memory (RANI). The memory 104 can both store and instantiate instruction code for execution by the processor. Other sub-systems in the mobile device 100 can also include processor elements that can be suited to particular purposes. In general, the memory includes instruction code for an application program that can access location information, which indicates the present location of the mobile device 100, and which can receive geofence region definitions from a remote server, and compare those to the present location to determine when the mobile device is within a geographic region described by a geofence region definition, and whether a direction of travel of the mobile device is compliant with an indicated direction of travel for the geofence region definition. That is, the instruction code allows the mobile device to determine whether it is traveling in the correct direction. Furthermore, when it is determined that the mobile device 100 is heading in a direction that is sufficiently the opposite of the indicated direction for the region, the instruction code allows the mobile device 100 to alert the user of the mobile device that the user may be traveling in the wrong direction. A necessary sub-system is a cellular transceiver 108 for communicating with a terrestrial network. Although such networks were originally relied upon for voice call traffic, today they are heavily used for data communications and cellular networks are connected to the Internet to facilitate interconnectivity and data communications. Accordingly, the mobile device 100 can communicate with a remote server or data center to retrieve geofence region definitions that can be used by an application program executed by the processor to determine whether the mobile device 100 is heading in a wrong traffic direction.

In order to facilitate location and direction determination, the mobile device 100 can include, for example, a satellite positioning receiver 106, such as a receiver designed to receive signals from satellites in the Global Positioning System (GPS). GPS receivers are commonly used in many mobile devices for navigation and positioning functions and they output global coordinates. It is also common that mobile devices include an electronic compass 110 that indicates an orientation of the mobile device relative to magnetic north. Also, many mobile devices include an inertial sensor such as an accelerometer 112 that can be used to detect and quantify changes in inertia as well as the direction of gravitational acceleration relative to the mobile device.

The processor 102 is further interfaced with several user interface elements, such as a graphic display 114, input devices such as buttons and touch input such as a touch keyboard 116 which can be provided as a portion of the graphic display (e.g. a touch sensing layer). The processor 102 is further interface with an audio system that includes a loudspeaker 118 and a microphone 120, which may be operated or controlled by an audio processor. The processor 102 can cause alerts or notifications to be realized using the graphical display 114 and the loudspeaker 118 for visual and audible output, respectively. For example, a message can be displayed on the graphical display 114, and an alert sound can be emitted from the loudspeaker 118 to indicate to a user of the mobile device 100 that it appears that the mobile device 100, and by implication the vehicle in which the mobile device 100 is located, is traveling in a wrong traffic direction. As used here, a wrong traffic direction means the opposite direction that traffic is allowed to flow on a given roadway. For example, one-way streets, freeway exit and entrance ramps, and opposing lanes on roadways all have a defined direction of travel that is allowed. When people enter such roadway sections in the wrong direction it creates a risk of collision and other issues.

Figure 2:
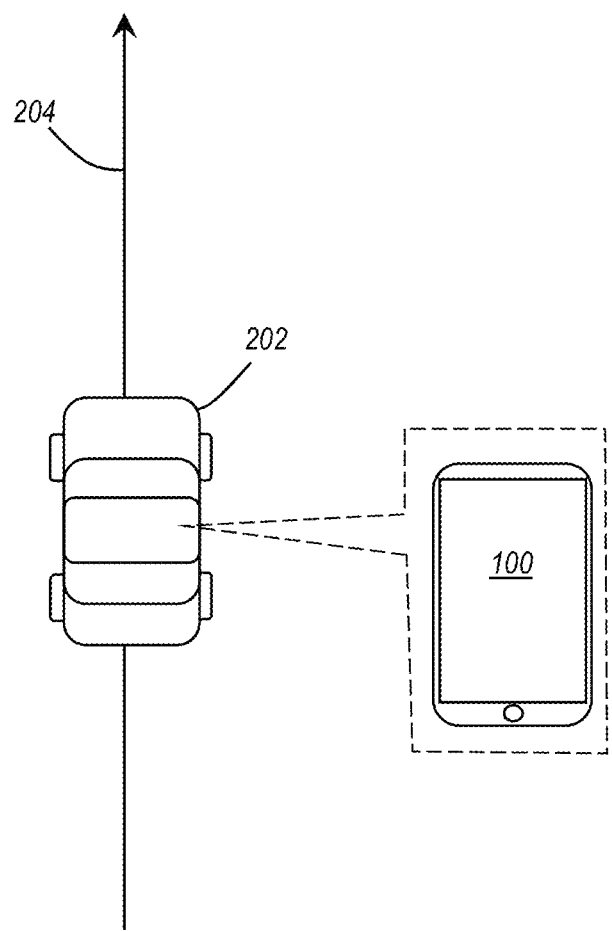
FIG. 2 shows a vehicle in which a mobile such as that shown in FIG. 1 is located, wherein the vehicle has a direction of travel that can be detected by the mobile device, in accordance with some embodiments.

FIG. 2 shows a vehicle 202 in which a mobile device 100 such as that shown in FIG. 1 is located, wherein the vehicle has a direction of travel, indicated by arrow 204, that can be detected by the mobile device, in accordance with some embodiments. The mobile device 100 includes components to determine its present location, as well as a direction of travel. Further, the mobile device 100 is able to receive geofence region definitions and compare its location to those definitions to determine if the mobile device 100 is within any of those definitions. There are a variety of ways in which the direction of travel can be determined. The simplest is to infer the direction based on sequential location "fixes" by the GPS receiver and determining the location difference between them over a short time. As the vehicle 202 travels along a roadway, sequential location fixes are used by the mobile device 202 to determine the direction of travel 204. Other methods of directional determination can be made using inertial sensors and an electronic compass, although this method assumes the mobile device is not moving relative to the vehicle (i.e. the device is not being handled/moved by a person inside the vehicle).

Figure 3:
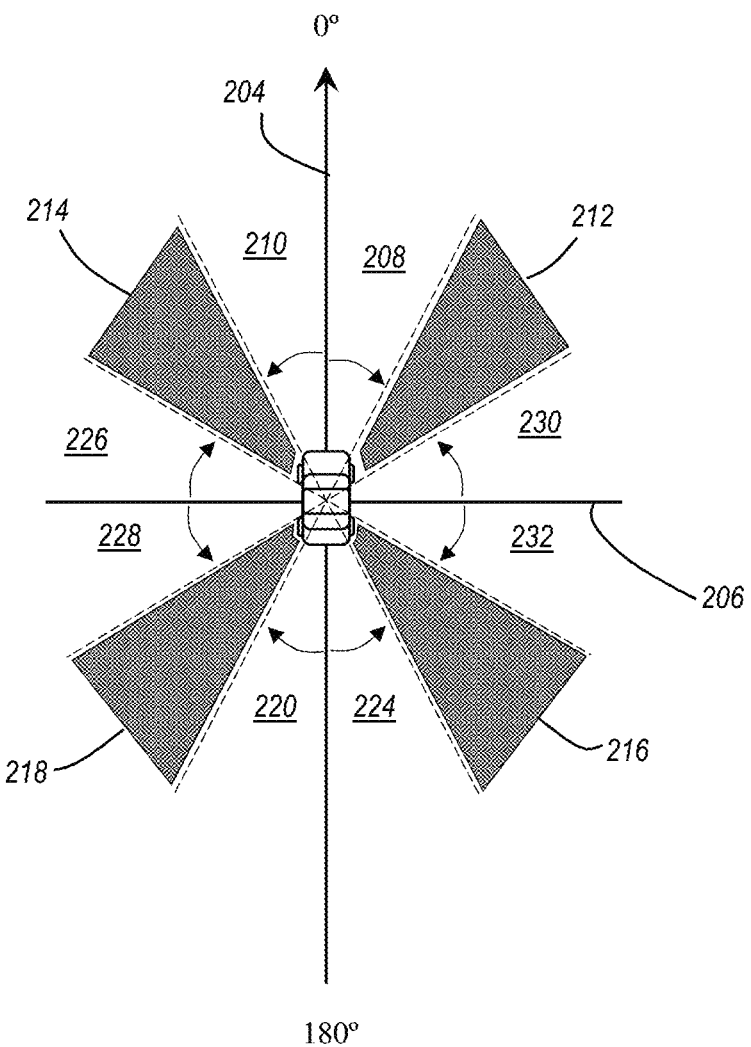
FIG. 3 is a bearing diagram mapped over a vehicle showing regions indicating a correct bearing, an incorrect bearing, and neutral bearing directions, in accordance with some embodiments.

FIG. 3 is a bearing diagram mapped over a vehicle 202 showing regions indicating a correct bearing, an incorrect bearing, and neutral bearing directions, in accordance with some embodiments. It can be assumed that the operator of the vehicle 202 has a mobile device such as that described in reference to FIG. 1, and the mobile device determines the direction of travel 204 of the vehicle. Further, the mobile device can communicate with a server, via a network, and receive geofence region definitions. In particular, the geofence definitions are for specific sections of roadways that are intended to allow traffic to flow in one direction. For example, the portions of exit and entrance ramps for freeways where those ramps connect to cross roads. A geofence region definition for the portion of an entrance ramp that connects to a cross road, for example is a boundary around the initial portion of the entrance ramp, and geofence definition includes geographic boundary information as well as information that indicates the allowed direction of travel for vehicles in that geographic boundary. However, it is not unusual that such roadway segments are not straight, and it is also true that drivers can drive in a direction, momentarily, that is not straight along a section of roadway with respect to that roadway. Thus, it is expected that the actual direction of travel of a vehicle will not necessarily be exactly the same as a defined direction of travel for that roadway.

To accommodate differences between the actual direction of travel and the defined direction of travel for a given geofence region corresponding to the roadway section, an angle between the actual direction of travel and the defined direction of travel can be determined and compared to allowed differences. FIG. 3 shows the actual direction of travel 204 of a vehicle and the angular range about the vehicle is separated into various sectors. Thus, the actual direction of travel can be defined as the zero degree (0°) orientation, and thus the exact opposite direction is the 180° angle. A perpendicular direction 206 can also be defined. Two forward sectors 208, 210 represent regions that, when the angle between the actual direction of travel and defined direction of travel falls within, it will be assumed that the vehicle is traveling in the correct direction for the geofence region. The angle of these sectors can be +/−30° in some embodiments, or more or less in other embodiments. Together, sectors 208, 210 can span an angle 60°. Sectors 220, 224 represent an angle which, if the defined region of travel falls, it is assumed that the vehicle is traveling in a wrong direction, and the vehicle is at risk of colliding with traffic headed in the correct direction. Sectors 226, 228, 230, 232 represent cross traffic directions; if the defined direction of travel falls in these sectors it can be assumed that the vehicle is passing by the geofence region and not actually driving along the roadway corresponding to the geofence region, as can occur, for example, when driving on a bridge over the geofence region. Guard regions 212, 214, 216, 218 can be indeterminate regions where, if the defined direction of travel falls within one of the guard regions 212, 214, 216, 218, no determination is made regarding the comparison of the defined direction of travel with the actual direction of travel of the vehicle.

Figure 4:
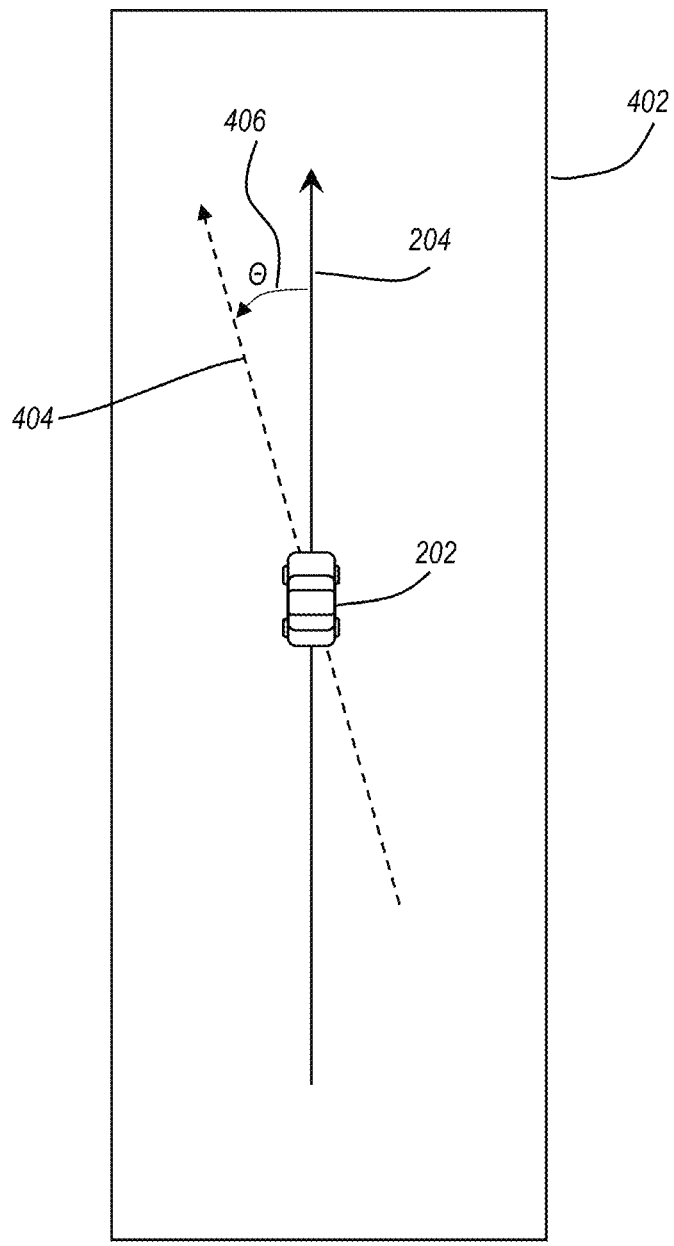
FIG. 4 shows an example of a vehicle on a roadway over which a geofenced region is defined, where the vehicle is heading in a correct direction according to the geofence bearing definition, in accordance with some embodiments.
Figure 5:
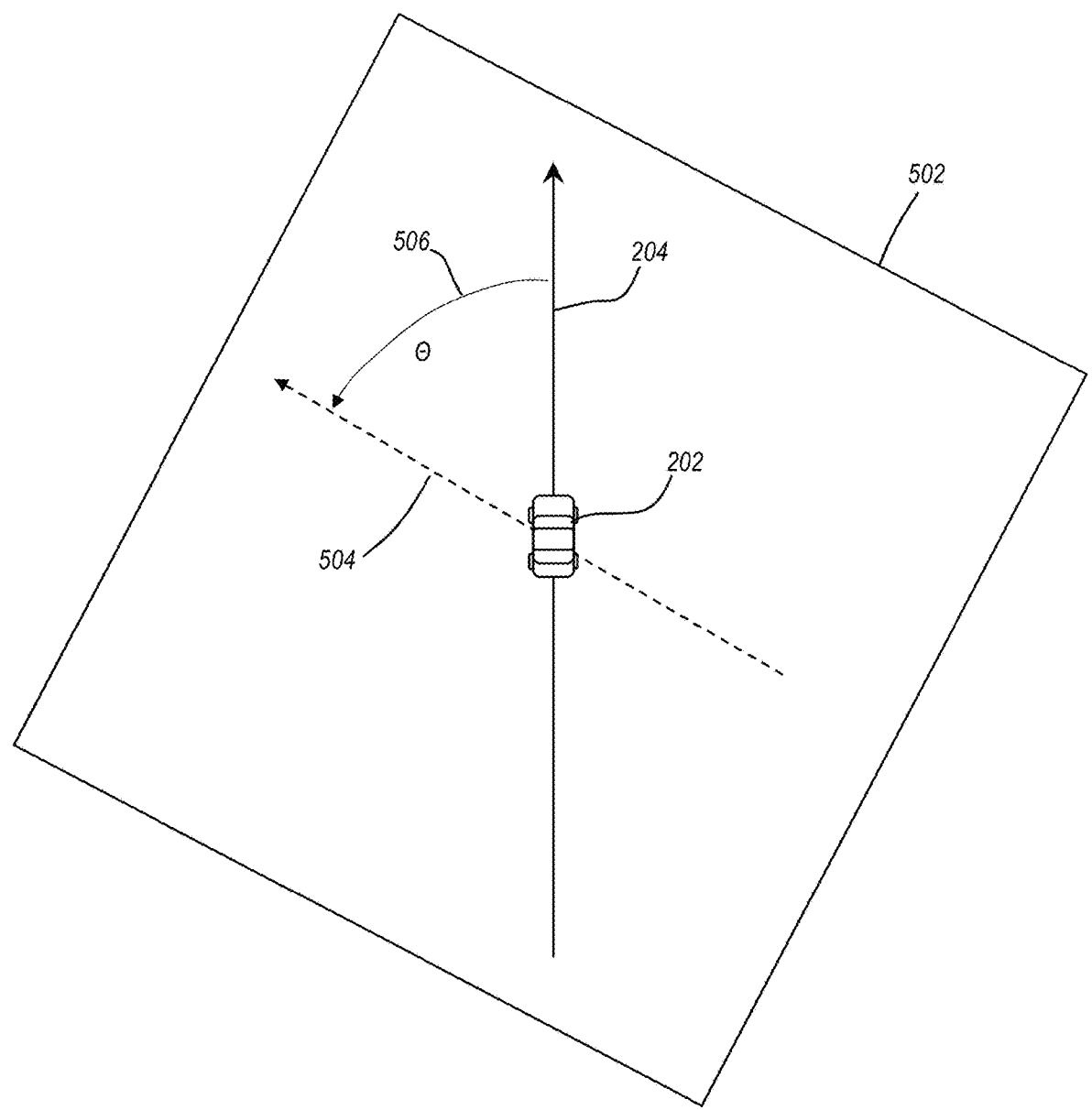
FIG. 5 show an example of a vehicle on a roadway over which a geofenced region is defined, where the vehicle is heading in a neutral direction according to the geofence bearing definition, in accordance with some embodiments.
Figure 6:
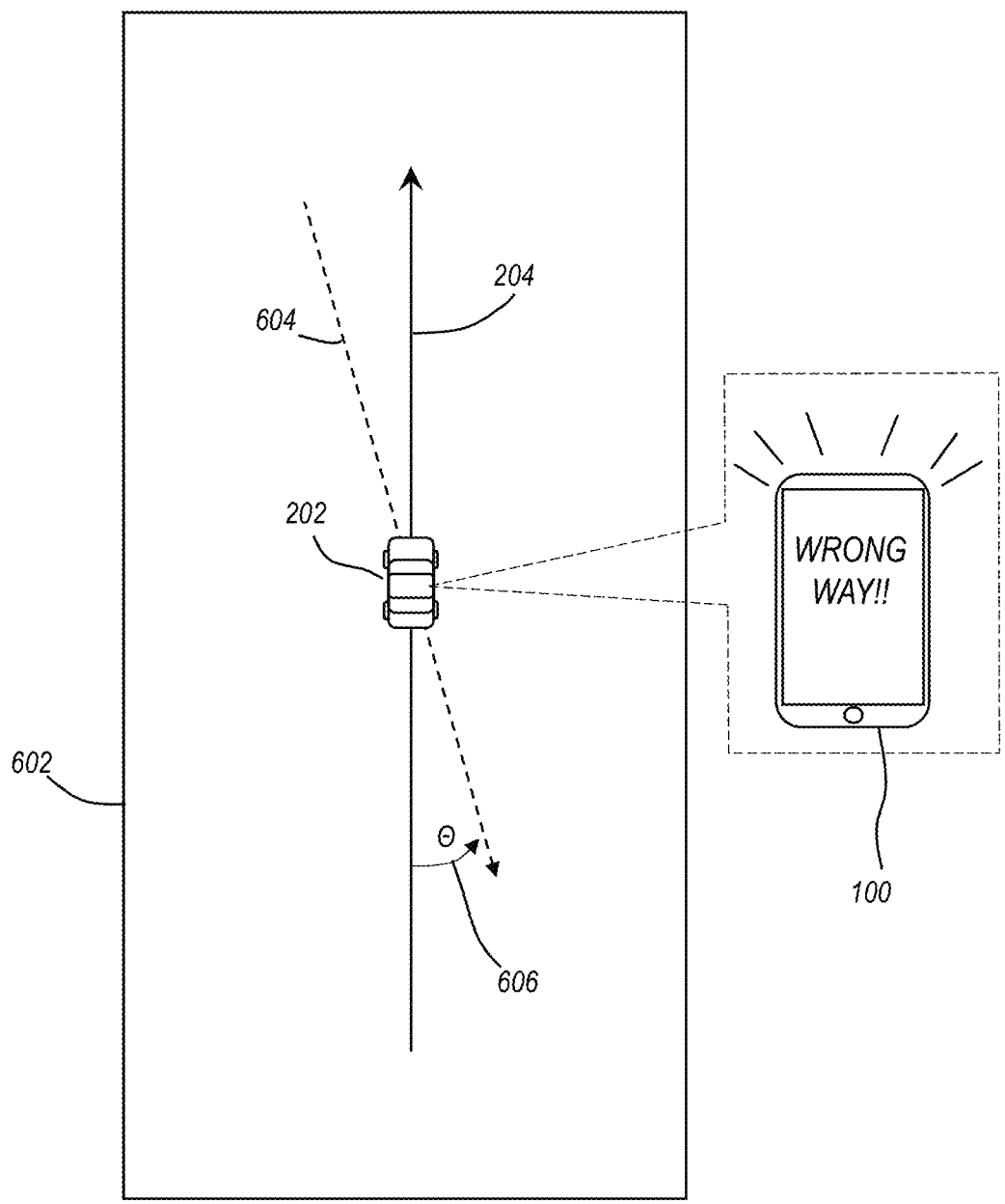
FIG. 6 shows an example of a vehicle on a roadway over which a geofenced region is defined, where the vehicle is heading in a wrong direction according to the geofence bearing definition, in accordance with some embodiments.

To illustrate how the determinations are made, FIGS. 4-6 provide examples of different situations. In all of the examples and vehicle 202 includes a mobile device such as that shown in FIG. 1, operable to communicate with a remote server to obtain geofence region definitions. In some embodiments, the mobile device can report its present location to the remote server, and the remote server can determine all of the geofence region definitions that correspond to locations within a certain distance of the vehicle 202 (meaning the location of the mobile device). The remote server can then transmit geofence region definitions to the mobile device, which the mobile device can store locally for real time use. This process can be repeated periodically or when the mobile device has moved a selected distance from the location where it first requested geofence region definitions. Each geofence region definition includes a defined direction of travel for the geofence region. The direction can be expressed as a vector of two location coordinates, or as an angle relative to North, or some other information. The mobile device then compares its actual direction of travel with the defined direction of travel, and applies the rules corresponding to the defined angle definitions as described in relation to FIG. 3. If the angle between the actual direction of travel and the defined direction of travel falls within sector 208, 210, then it is assumed the vehicle is traveling in a correct direction. If the angle between the actual direction of travel and the defined direction of travel falls within sector 220, 224, then it is assumed that the vehicle 202 is traveling in the wrong direction, and then in response the mobile device will issue an alert notification to the user.

FIG. 4 shows an example of a vehicle 202 on a roadway over which a geofenced region is defined, where the vehicle 202 is heading in a correct direction according to the geofence bearing definition, in accordance with some embodiments. As shown here, a geofence region 402 has a defined direction of travel 404, which is represented by a dashed line. The geofence region 402 can represent a rectangular region defined over a section of a roadway, such as a portion of a freeway, including a traffic lane or an access ramp. In some embodiments the geofence region 402 can correspond to a portion of a one-way street. In some embodiments, the geofence region is an irregular shape, rather than a rectangle. The defined direction of travel 404 can be expressed in the data of the geofence region definition as a vector of coordinates, a compass bearing, or equivalent information that indicates a direction. Over time, the mobile device, by executing the application program, periodically determines its location, and compares the present/most recent location to one or more geofence region definitions. If the present location is within one of the geofenced regions, as indicated by the comparison process, then the defined direction of travel 404 is compared with the actual direction of travel 204 to determine an angle of difference 406. In this example the angle of difference 406 is within an acceptable range, indicating the vehicle is traveling in a correct direction, or at least not at risk of a head-on collision due to traveling in a direction opposite that of the defined direction of travel 404 for the geofence region 402.

FIG. 5 shows an example of a vehicle 202 on a roadway over which a geofenced region 502 is defined, where the vehicle is heading in a neutral direction according to the geofence bearing definition, in accordance with some embodiments. In this case, the defined direction of travel 504 for the geofence region 502 is at an angle 506 with the actual direction of travel 204 that is outside a range indicating the vehicle is traveling in a correct direction, but not in a range than indicates the vehicle is traveling in an incorrect direction. This can occur in many instances. For example, the vehicle 202 can be passing over a geofence region 502 on a bridge, pulling over to the side of the roadway over which the geofence region 404 is defined, and so on. However, the vehicle 202 is not apparently traveling in an incorrect direction, so no warning notification is issued.

FIG. 6 shows an example of a vehicle 202 on a roadway over which a geofenced region 602 is defined, where the vehicle is heading in a wrong direction according to the geofence bearing definition, in accordance with some embodiments. In this case the actual direction of travel 204 of the vehicle 202, as determined by the mobile device 100 in the vehicle 202, is at an angle 606 with the defined direction of travel 604 for the geofence region 602 is in a range indicating the vehicle 202 is traveling in the opposite direction of that allowed for the roadway over which the geofence region 602 is defined. Accordingly, the mobile device 100 will then issue an alert notification such as emitting an alarm sound, displaying a visual alert, vibrating, or any combination of those notification modes. Further, when this occurs, the mobile device 100 can send an alert message with the present location of the vehicle to a traffic authority, or to a backend server that relays the message to a traffic authority. In some embodiments, the alert message can be sent after a preselected period of time has passed to give the driver of the vehicle 202 time to take corrective action before contacting the traffic authority. In the event that the vehicle continues in the unsafe direction, after receiving the alert message, the traffic authority can take mitigation action, such as displaying warning messages on electronic signs to drivers heading in the direction of the wrong-way driver, dispatching police to intercept the wrong-way driver, among other actions. In some embodiments the angle 606 can be within +/−30° of 180° (150° to 210° of the actual direction of travel 204).

Figure 7:
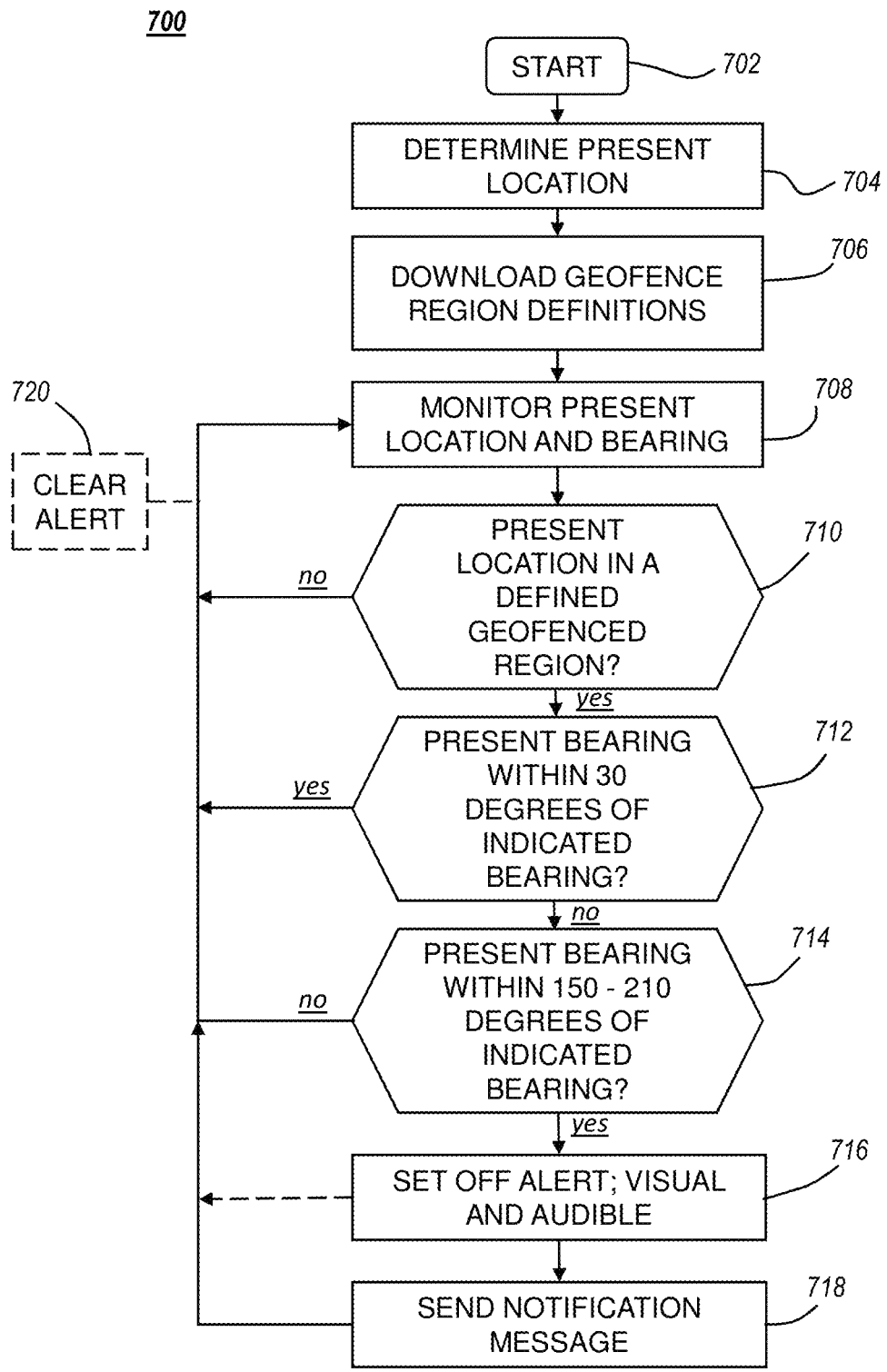
FIG. 7 is a flow chart diagram of a method of determining whether a vehicle is traveling in the wrong direction, in accordance with some embodiments.

FIG. 7 is a flow chart diagram of a method 700 for determining whether a vehicle is traveling in the wrong direction, in accordance with some embodiments. At the start 702 it is assumed that a mobile device running an appropriately designed application program is located in a vehicle. As initial matters, in step 704 the mobile device determines its present location. In step 706 the present location can be reported by the mobile device to a remote backend server using communications over the Internet and associated networks (e.g. the cellular network). The backend server can then respond with a plurality geofence region definitions for regions within a selected distance of the present location of the mobile device, which are received/downloaded by the mobile device. In another embodiment the backend server processes the GPS data from the mobile device containing the present location coordinates (latitude and longitude), bearing, date and time, traveling speed, accuracy radius, user ID, vehicle ID, battery status, along with other inertial unit measurement parameters as shown in the mobile device 100. Steps 704, 706 can be repeated as a background process whenever the present location of the mobile device has changed by a preselected threshold distance from the location used to last receive geofence region definitions. Each geofence region definition contains boundary information for the region in location coordinates, and an indication of the defined direction of travel for the geofence region definition. Each geofence region definition corresponds to a section of a roadway in which traffic is required to travel in one direction (e.g. not bi-directional roadways).

In step 708 the mobile device monitors its present location by periodically updating its present position and bearing information. That is, periodically the application program software requests information from sub-systems of the mobile device, such as the GPS receiver, inertial sensor, compass, etc. to determine the present location in geolocation terms that can be compared to the geofence region definitions in step 710. Bearing information can be inferred based on past locations of the mobile device along with the present location of the mobile device, or from the GPS data. If the present location of the mobile device is not in any of the geofence region definitions then the method returns to step 708 until the next periodic check. If the present location is within one of the geofence regions definitions, then the method 700 proceeds to step 712 where the present direction of travel is determined and compared with the defined direction of travel for the geofence region definition in which the mobile device is located. If the angle between the actual direction of travel and the defined direction of travel is within the preselected threshold indicating the vehicle is traveling in the correct direction, then no action is taken and the method returns to step 708. If the angle between the actual and defined directions of travel is not within the preselected threshold indicating the vehicle is traveling in the correct direction, then the method proceeds to step 714. In step 714 the method determines whether the angle between the actual direction of travel and the defined direction of travel is within a preselected range indicating the vehicle is traveling in an incorrect direction. If the angle is outside of that preselected range, then the method returns to step 708. However, if the angle is within that preselected range, then the method proceeds to step 716 in which the mobile device issues an alert notification that can be tactile, visual, audible, and any combination of those modes of alerting. From step 716 the method may, initially, return to step 708 while maintaining the alerting activity. In a subsequent iteration of the method, if step 716 is again reached, then the method can proceed to step 718 in which the mobile device sends an alert message to notify authorities of the wrong-way vehicle so that any available mitigation measures may be taken to reduce the likelihood of a collision. After the alert notification process has been activated in step 716, the driver may take corrective action to travel in the correct direction, or exit the geofence region, in which case in step 720 the alert notification process can be ceased and the alert cleared.

Figure 8:
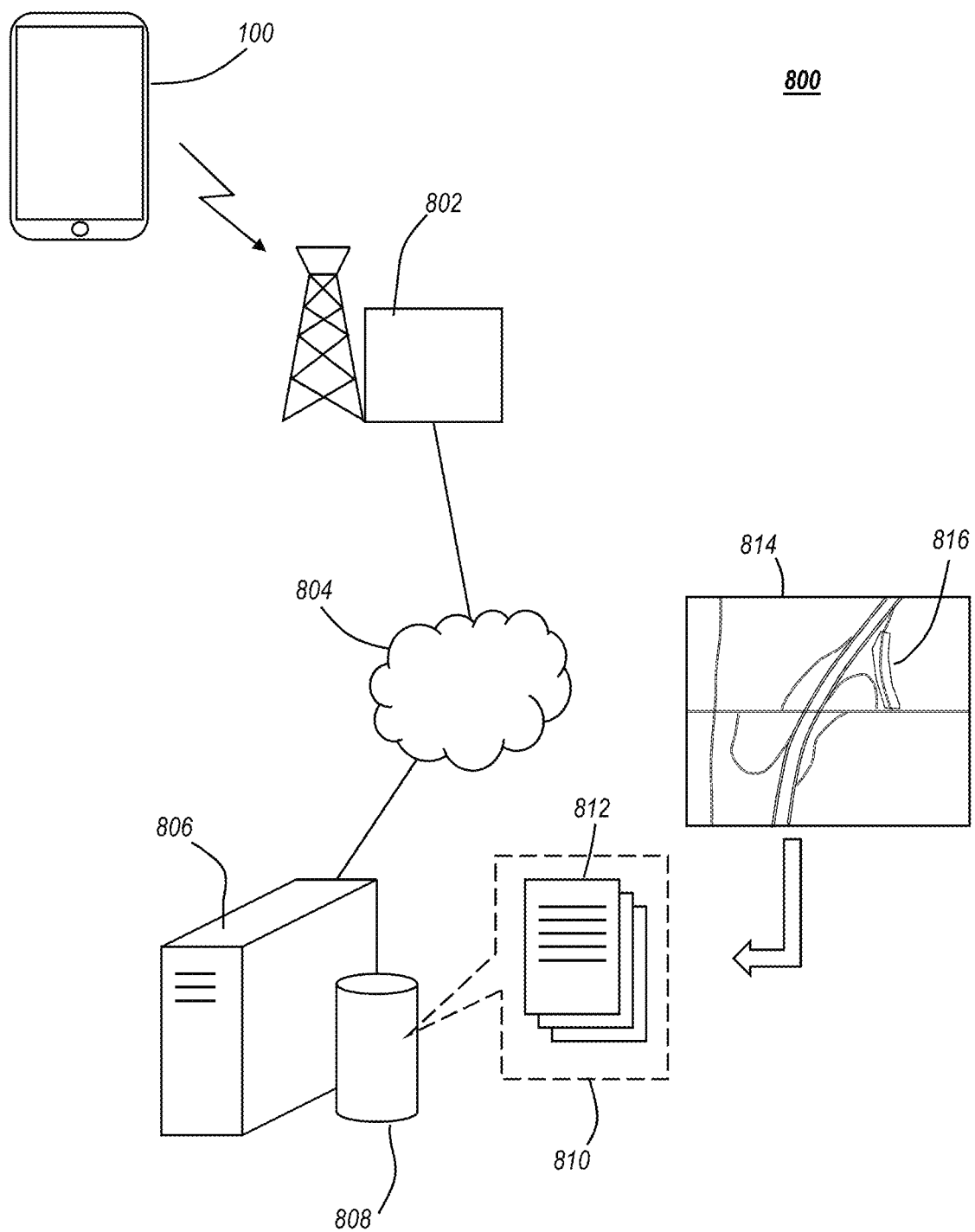
FIG. 8 shows a system diagram in which a mobile device can receive geofenced region definition data from a server, in accordance with some embodiments.

FIG. 8 shows a system diagram in which a mobile device can receive geofenced region definition data from a server, in accordance with some embodiments. The system 800 includes mobile device 100 which can communicate with a cellular network 802. The cellular network acts, essentially, as an access point to communicate over the Internet 804. Accordingly, equivalent access means can be used, such as Wi-Fi, for example. A backend server 806 is also connected to the Internet 804 and the mobile device 100, using an appropriate application program, can communicate with the server 806. The server 806 can be one of several server elements in a data center and is interface with a data store 808 that can be a database used to organize geofence region definition records. Thus, the data store 808 includes a plurality of geofence region definitions 810. Each geofence region definition corresponds to a section of a roadway that allows traffic in only one direction. The geofence region definitions 810 can be created using a street map 814 on a coordinate grid that allows determination of coordinates for any point on the map. Thus a section of a roadway, such as an entrance ramp for a freeway (roadway with restricted access), can have a geofence 816 drawn over it, where the boundary of the geofence 816 is defined as a polygon having vertices of location coordinates. These location coordinates can be arranged into a data structure to produce a geofence region definition 812. In addition, the geofence region definition 812 includes a defined direction of travel.

It is contemplated that the application program on the mobile device 100 can be a tolling application program that determines toll transactions for the vehicle. In conducting toll transactions, the tolling application program uses geofence region definitions for tollways and toll points in order to determine when the vehicle has passed through a toll point, and thus owes a toll fee. The geofence region definitions 810 pertaining to one-way streets and roadways can be downloaded by the mobile device 100 along with geofence region definitions used for tolling transactions. Thus, method 700 can be a process that occurs in the execution of the tolling application program in some embodiments. In other embodiments the method 700 can be conducted separate from a tolling application, as a stand-alone application program. In still other embodiments, the method 700 can be including in a navigation application program that is used by drivers to navigate to a destination.

Figure 9:
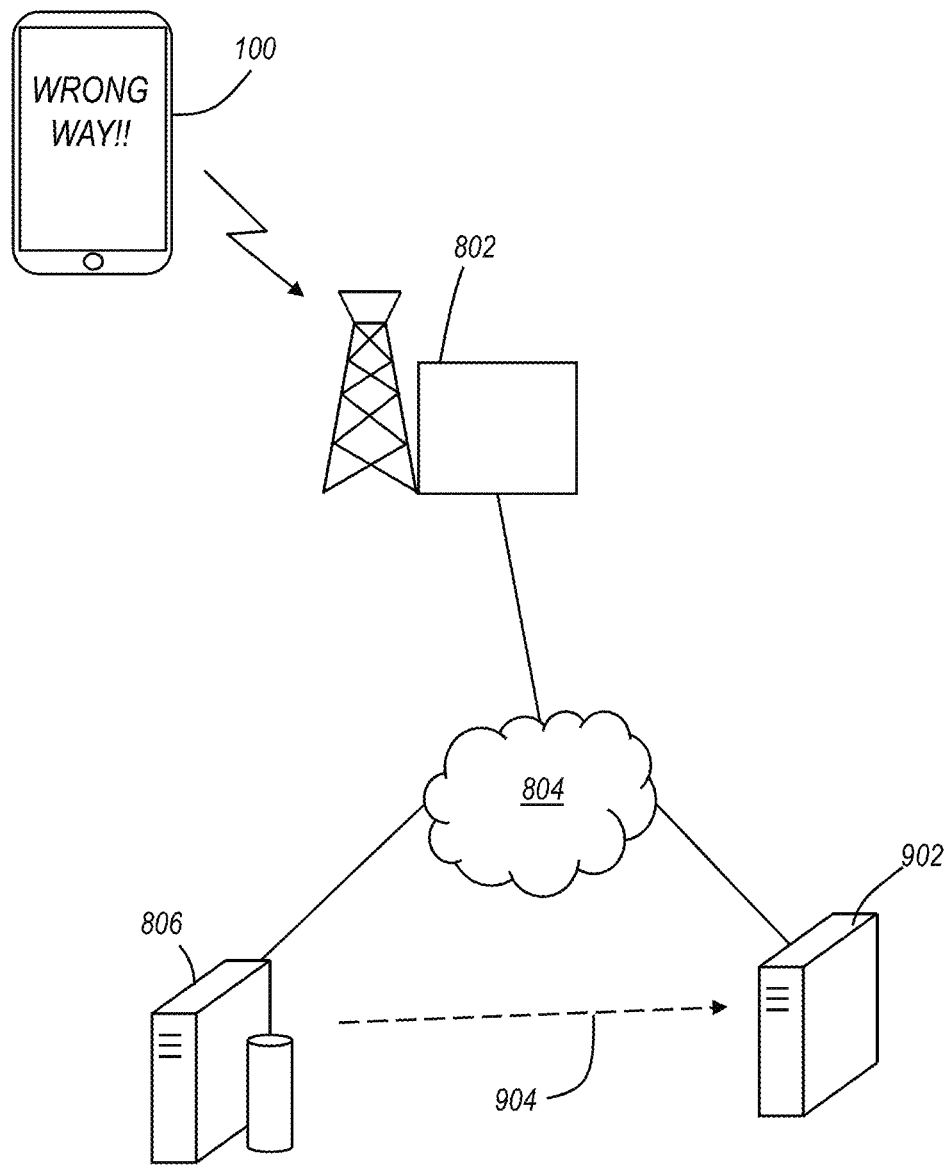
FIG. 9 shows a system diagram in which a mobile device relays an alert message to a server, which in turn provides information to a reporting server, in accordance with some embodiments.

FIG. 9 shows a system diagram in which a mobile device 100 relays an alert message to a server 806, which in turn provides information to a reporting server 902, in accordance with some embodiments. When the mobile device 100 has determined that the vehicle is traveling in an opposite direction from that defined for the present region in which the vehicle is located, the mobile device 100, upon or after issuing the alert notification, can send an alert message to the server 806 including the present location, roadway name, vehicle description (if entered by the user), and so on. In some embodiments the alert message can be a stream of data sent by the mobile device 100 to the server 806 in a communication session. Upon receiving the alert message, the server 806 can then contact a reporting server 902 that is operated by a traffic authority (e.g. public safety, police). The server 806 can be under control of the entity that produced the application program on the mobile device 100, and can have access to a database of reporting server information in order to determine which reporting server to contact and give the location of the mobile device 100. In response, the entity operating the reporting server 902 can take mitigation actions to, for example, alert other drivers of the oncoming vehicle through electronic road sign, alert text messages broadcast to mobile devices in the area, sending police to intercept the wrong-way driver, and so on.

Figure 10:
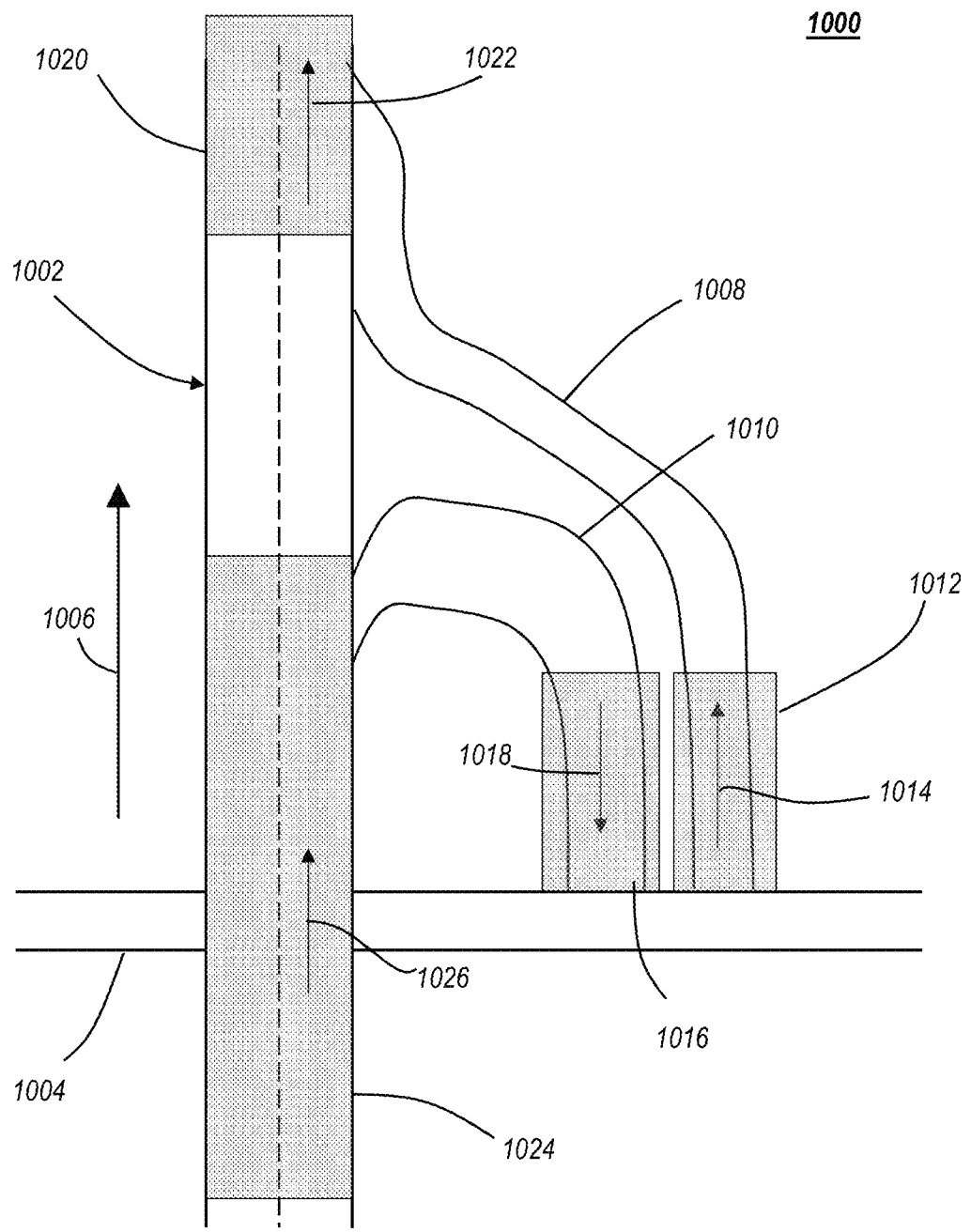
FIG. 10 shows an exemplary roadway having defined geofenced regions for indicating proper bearing direction, in accordance with some embodiments.

FIG. 10 shows an exemplary roadway 1000 having defined geofenced regions for indicating proper bearing direction, in accordance with some embodiments. The roadway 1000 includes one or more lanes of unidirectional traffic 1002, which can be a restricted access highway, for example. Traffic in the lanes 1002 are required to travel in the direction of arrow 1006. Lanes for traveling in the opposite direction are separated from lanes 1002, such as by a median, or other barrier. The lanes 1002 can pass over a cross road 1004 on which traffic can be bi-directional. To access the roadway lanes 1002 from the cross road 1004, vehicles can use an entrance ramp 1008. And to exit from the roadway lanes 1002 to access cross road 1004, vehicles in the roadway lanes 1004 can exit using an exit ramp 1010. This is one example of an intersection of a restricted access roadway with a cross road, and the exit and entrance ramps connecting them, however there are numerous other examples of various roadway configurations for access and egress ramps.

Because it is critical to drive in the correct direction, several geofence regions are defined. For example, on the entrance ramp 1008 a geofence region 1012 is defined over the portion that connects to the cross road 1004. A geofence region definition is created corresponding to, and describing in geolocation terms, the boundary of geofence region 1012. In addition, a defined direction of travel 1014 is included in the geofence region definition for geofence region 1012. Similarly, a geofence region 1016 can be defined over the portion of the exit ramp 1010 that connects to the cross road 1004. It has a defined direction of travel 1018 that is in the opposite direction of that for the entrance ramp 1008. For further assurance that wrong way driving is detected, geofence regions 1020 and 1024 can be defined over portions of the roadway lanes 1002, with corresponding directional indications 1022, 1026. Thus, if a driver using a mobile device running an appropriate application program inadvertently drives onto the exit ramp 1010 from cross road 1004, opposite the defined direction of travel 1018, the mobile device will issue an alert notification. The alert notification may cease when the vehicle leaves geofence region 1016, but can commence again when the driver/vehicle enter geofence region 1024 in a direction opposite the defined direction of travel 1026. In some embodiments a road segment like the exit ramp 1010 may have several successive geofence regions defined since the direction of travel continuously changes as a vehicle drives along it (in either direction).

Accordingly, a method and system for alerting drivers that they are traveling in the wrong direction on a roadway has been disclosed. The method involves defining geofenced regions over particular portions of roadways and indicating a proper bearing direction of travel for vehicles in those geofenced regions. The geofenced regions can be dynamically defined to take into account events like road construction where a portion of the roadway may be intentionally opened for traffic going in the opposite direction. An application program on the user's mobile device or the backend server is capable of determining its location and bearing, and using that information to compare with geofenced regions. When the application program determines that it (and therefore the vehicle) is in a defined geofenced region, the indicated proper bearing direction is ascertained and compared with the vehicle's bearing direction as determined by the mobile device using the application program. If the vehicle's bearing direction is substantially the opposite of that indicated as the proper bearing direction, a wrong way driving alert is then commenced.

What is claimed is:

1. A method for alerting a driver of wrong way driving, comprising:
   defining a geofenced region over a portion of a roadway, including location boundaries of the geofenced region and a proper bearing direction for traffic traveling through the geofenced region;
   a mobile device in a vehicle determining, by execution of a toll application program instantiated on the mobile device, a present location of the mobile device;
   the mobile device determining that the present location of the mobile device is within the geofenced region;
   the mobile device determining a present bearing direction by the mobile device for the present location of the mobile device;
   the mobile device comparing the bearing direction with the proper bearing direction for traffic traveling through the geofenced region;
   the mobile device determining that the present bearing direction is substantially an opposite direction from that of the proper bearing direction for traffic traveling through the geofenced region;
   the mobile device alerting the user of the mobile device by at least one of an audible alert or a visual alert;
   the mobile device transmitting a message to a back end server of a service associated with an application program on the mobile device that performs the determining, comparing, and alerting steps, the message indicating a present location of the vehicle;
   the back end server determining a traffic authority associated with the present location of the vehicle; and
   the back end server transmitting a wrong way vehicle alert message to the traffic authority.

2. The method of claim 1, wherein defining the geofenced region over a portion of the roadway comprises defining the geofenced region over a traffic lane of the geofenced roadway along a portion of the roadway prior to an exit ramp of the roadway.

3. The method of claim 1, wherein defining the geofenced region over a portion of the roadway comprises defining the geofenced region over an initial portion of an exit ramp of the roadway where the exit ramp meets a cross road to the roadway.

4. The method of claim 1, wherein determining a present bearing direction comprises receiving a bearing from a satellite location receiver of the mobile device.

5. The method of claim 1, further comprising:
   the mobile device transmitting its present location to a backend server;
   wherein comparing the bearing direction with the proper bearing direction for traffic traveling through the geofenced region and determining that the present bearing direction is substantially the opposite direction from that of the proper bearing direction for traffic traveling through the geofenced region is performed by the backend server; and
   the backend server transmitting an alert message to the mobile device.

6. The method of claim 1, wherein alerting the user of the device comprises playing an audible alert by the device.

7. The method of claim 4, wherein playing the audible alert comprises playing a voice recording indicating that the vehicle is traveling in the wrong direction.

8. The method of claim 1, further comprising the traffic authority performing at least one of:
   activating a road sign on the roadway indicating an oncoming wrong-way driver; or
   causing an alert message to be broadcast in a region of the roadway over a cellular communication system.

9. A method for determining that a vehicle in which a mobile device is located is traveling in a wrong-way direction on a roadway, comprising:
   defining a geofenced region over a portion of the roadway, the geofenced definition including location boundaries of the geofenced region and a proper bearing direction for traffic traveling through the geofenced region;
   the mobile device determining a present location and a bearing direction of the mobile device;
   determining that the present location of the mobile device is within the geofenced region;
   determining that the present bearing direction is substantially an opposite direction from that of the proper bearing direction for traffic traveling through the geofenced region by:
     comparing the bearing direction of the mobile device with the proper bearing direction for traffic traveling through the geofenced area;
     determining that an angle of the bearing direction of the mobile device is not within a first angle relative to the proper bearing direction;
     determining that an angle of the bearing direction of the mobile device is greater than a second angle relative to the proper bearing direction, where the second angle is greater than the first angle, and wherein there is a separation between the first angle and the second angle; and
   the mobile device alerting the user of the mobile device by at least one of an audible alert or a visual alert.

10. The method of claim 9, further comprising:
    after alerting the user of the device, and after a preselected period of time, determining a subsequent location and bearing direction and determining that the subsequent location and bearing direction indicate that the mobile device is traveling in a wrong direction on the roadway; and
    the mobile device transmitting an alert message to a backend server indicating that the mobile device is traveling in wrong way direction.

11. The method of claim 10, wherein determining that the subsequent location and bearing direction indicate that the mobile device is traveling in a wrong direction on the roadway comprises comparing the subsequent location and bearing direction with another geofence region definition that is defined over the roadway.

12. The method of claim 10, further comprising the backend server determining a region of the geofenced region definition and transmitting an alert message to a traffic authority associated with the region.

13. The method of claim 9, further comprising:
the mobile device transmitting the present location and bearing direction to a backend server;
wherein determining that the present location of the mobile device is within the geofenced region, comparing the bearing direction of the mobile device with the proper bearing direction for traffic traveling through the geofenced region, and determining that the present bearing direction is substantially an opposite direction from that of the proper bearing direction for traffic traveling through the geofenced region are performed by the backend server.

14. The method of claim 9, wherein determining that the present bearing direction is at an angle that is greater than the second angle comprises determining the present bearing direction is at least 150 degrees of the proper bearing direction.

15. A system for alerting a driver that the driver is traveling in a wrong direction for a roadway, comprising:
a mobile device having a satellite positioning receiver that produces location data indicating a present location of the mobile device;
a backend server coupled to a database in which a plurality of geofence region definitions are stored, each of the plurality of geofence region definitions defining a region of a roadway and indicating a proper bearing direction for that region of the roadway;
wherein the mobile device is configured to periodically determine its present location and its present bearing direction using the satellite positioning receiver, and wherein the mobile device is further configured to alert when the present location of the mobile is within a region corresponding to one of the plurality of geofenced region definitions and that the present bearing direction is substantially opposite that of the proper bearing direction for the one of the plurality of geofenced region definitions, wherein, to determine that the present bearing direction is substantially opposite that of the proper bearing direction, mobile device is configured to:
compare the bearing direction of the mobile device with the proper bearing direction for traffic traveling through the geofenced area;
determine that an angle of the bearing direction of the mobile device is not within a first angle relative to the proper bearing direction; and
determine that an angle of the bearing direction of the mobile device is greater than a second angle relative to the proper bearing direction, where the second angle is greater than the first angle, and wherein there is a separation between the first angle and the second angle.

16. The system of claim 15, wherein the mobile device is configured to transmit its present location and bearing direction to the backend server, and wherein the backend server is configured to compare the present location and bearing direction to at least one of the plurality of geofence region definitions to determine that that the present bearing direction is substantially opposite that of the proper bearing direction.

17. The system of claim 15, wherein the backend server is configured to transmit an alert message to a traffic authority server to report a location of the mobile device.

18. The system of claim 15, wherein the first angle is thirty degrees and the second angle is one hundred fifty degrees.

* * * * *